April 7, 1936.  J. M. KING  2,036,278
CONTAINER CLOSURE
Filed Sept. 30, 1935

Inventor
John M. King
By W. N. Roach
Attorney

Patented Apr. 7, 1936

2,036,278

UNITED STATES PATENT OFFICE 2,036,278

CONTAINER CLOSURE

John M. King, Dover, N. J.

Application September 30, 1935, Serial No. 42,866

2 Claims. (Cl. 102—24)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a container closure for flares and bombs.

In flares and bombs that are equipped with parachutes it is customary in launching to withdraw the closure and the parachute by means of a hangwire connected to the aircraft. In the method heretofore employed in accomplishing the task the closure is retained by the hangwire and when blown around underneath the aircraft it has frequently caused damage to the fabric of the aircraft.

The purpose of this invention is to provide an arrangement wherein the closure is freed from the hangwire as soon as it is removed from the container.

To these and other ends, the invention consists in the construction, arrangement and combination of elements described hereinafter and pointed out in the claims forming a part of this specification.

A practical embodiment of the invention is illustrated in the accompanying drawing, wherein.

Figure 1:
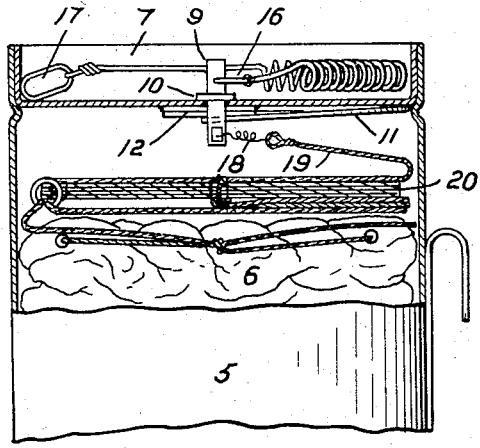
Fig. 1 is a view partly in elevation and partly longitudinal section of a flare constructed in accordance with the invention.

Referring to the drawing by characters of reference, there is shown a container 5 which represents a flare or bomb body that is adapted to be dropped from an aircraft in flight. The container is adapted to be suspended by a parachute 6 which is normally housed within the container and is arranged to be withdrawn therefrom after the container is launched from the aircraft.

A closure 7 fitted in one end of the container is formed with an aperture 8 for a stem 9 which has a collar 10 engaging the outer face of the closure. A spring 11 having one end fixed as at 12 to the marginal portion of the inner face of the closure, has a free end 13 inserted in an aperture 14 in the stem 9 and held therein when the bowed portion 15 of the spring is confined by the wall of the container 5.

A hangwire 16 secured to the outer part of the stem is normally housed in the closure during storage and transportation. It has a loop 17 on its free end whereby it is associated with the launching apparatus of the aircraft.

A tear-wire 18 fastened to the inner end of the stem is also connected to a pull-out cord 19 which is attached to the parachute 6 and also to the conventional disc 20.

Figure 2:
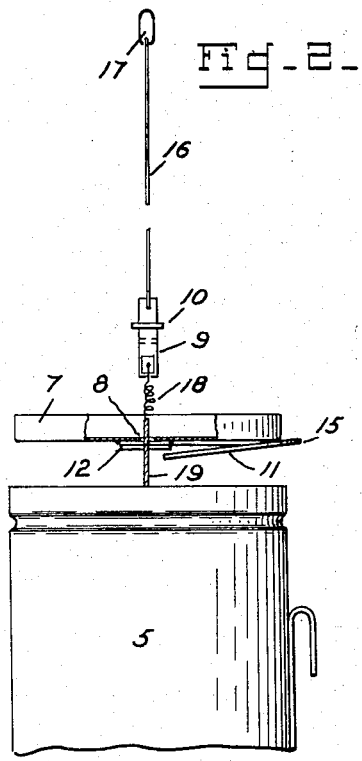
Fig. 2 is a view in elevation and partly in section showing the flare just after being launched.
Figure 3:
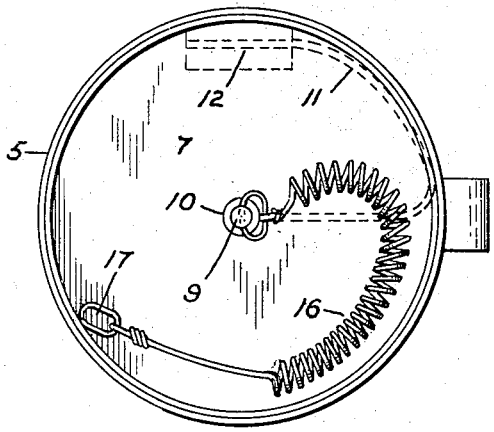
Fig. 3 is a plan view of the flare.
Figure 4:
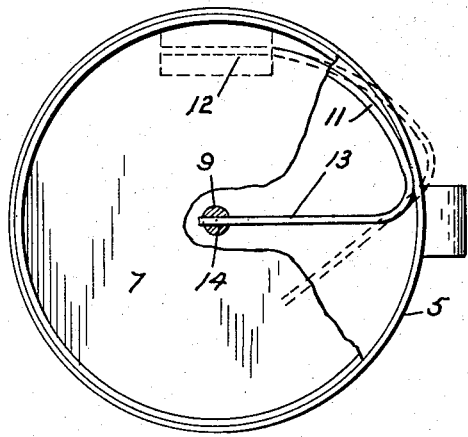
Fig. 4 is a plan view of the closure with parts broken away to show the spring.

In operation when the container 5 is launched from the aircraft the hangwire 16, which is attached to the aircraft, is drawn taut and removes the closure from the container. The spring 11, when no longer confined by the container, moves clear of the stem as shown in Fig. 2 and enables the closure to be relatively moved towards the container. When the parachute has been withdrawn from the container the weight of the container causes the tear-wire 18 to be broken and the container and the closure fall to the ground.

I claim:—

1. A container adapted to be launched from aircraft, a parachute normally housed in the container and arranged when withdrawn to suspend the container, a closure for the container, a stem passing through the closure, a hangwire attached to the outer end of the stem, a pull-out cord attached to the parachute and having a frangible connection with the inner end of the stem, and a bowed spring carried by the closure and having a free end passing through the inner end of the stem, the bow of the spring confined by the container.

2. A container adapted to be launched from aircraft, a parachute normally housed in the container and arranged when withdrawn to suspend the container, a closure for the container, a stem passing through the closure, a hangwire attached to the outer end of the stem, a pull-out cord attached to the parachute and having a frangible connection with the inner end of the stem, and a spring having an end passing through the inner end of the stem and normally held in this position by the container until the closure is removed.

JOHN M. KING.